March 5, 1968 E. B. SPANGLER ETAL 3,371,546
TORIC FRICTION TRANSMISSION WITH CROSS
PIN RATIO CHANGING CONTROL
Filed May 9, 1966 2 Sheets-Sheet 1

INVENTORS
Elson B. Spangler &
Milton H. Scheiter

Robert L. Spencer
ATTORNEY

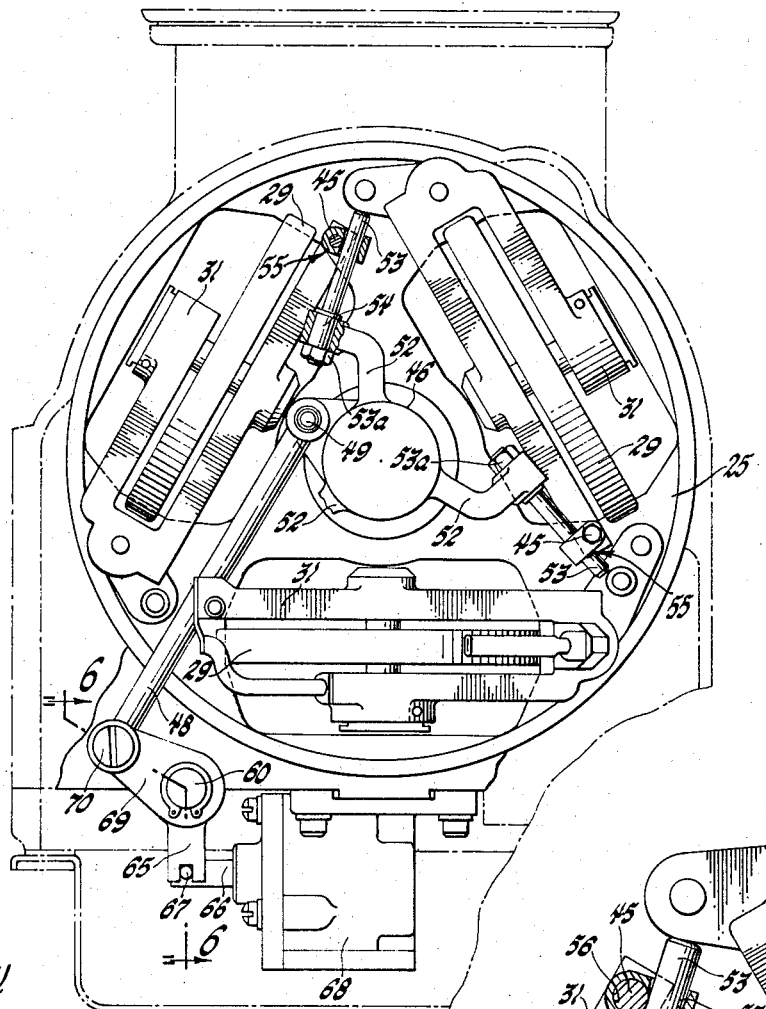

United States Patent Office 3,371,546
Patented Mar. 5, 1968

3,371,546
TORIC FRICTION TRANSMISSION WITH CROSS PIN RATIO CHANGING CONTROL
Elson B. Spangler, Bloomfield Hills, and Milton H. Scheiter, Birmingham, Mich., assignors to General Motors Corporation, Detroit, Mich., a corporation of Delaware
Filed May 9, 1966, Ser. No. 548,510
9 Claims. (Cl. 74—200)

This invention relates to toroidal friction drive transmissions and more particularly to an improved simple control structure for controlling the transmission drive ratio. The control system is useful in transmission assemblies having a single drive and drive torus but is particularly disclosed in a transmission having two friction drive units having a plurality of drive outputs.

The control system is arranged to provide change of ratio by utilizing a relatively small force to cause initial roller inclination and to utilize a relatively large steering force generated by the rollers to accomplish change of ratio. This arrangement is very advantageous in that an inexpensive, lightly constructed control mechanism may be utilized and maintain long useful life of the control mechanism due to the great reduction of stresses developed in the control linkage as compared to systems wherein change of roller position is accomplished by brute force. The control system specifically utilizes a swivel support for the roller carrier and cross pins between a ratio control collar and the carrier interconnected by a clip which permits relative rotation of the pins and clip upon rotation of the control collar. In addition the ratio control collar pin is supported in the ratio control collar by a base eccentric with respect to the pin to accommodate initial adjustment of the pin relative to the collar. This arrangement permits initial adjustment of the control mechanism to compensate for deviations in manufacturing tolerances and is an important feature.

The transmission herein is shown as including two friction units of similar structure and includes a common phasing shaft which may be rotated to simultaneously change the drive ratio of both units to change the transmission drive ratio. The ratio control collars of each unit are of similar structure and are rotatably supported upon a common support sleeve which also rotatably supports the power input torus for each unit and rotatably supports the power delivery shaft on which are mounted the output torus of each unit.

Figure 1:
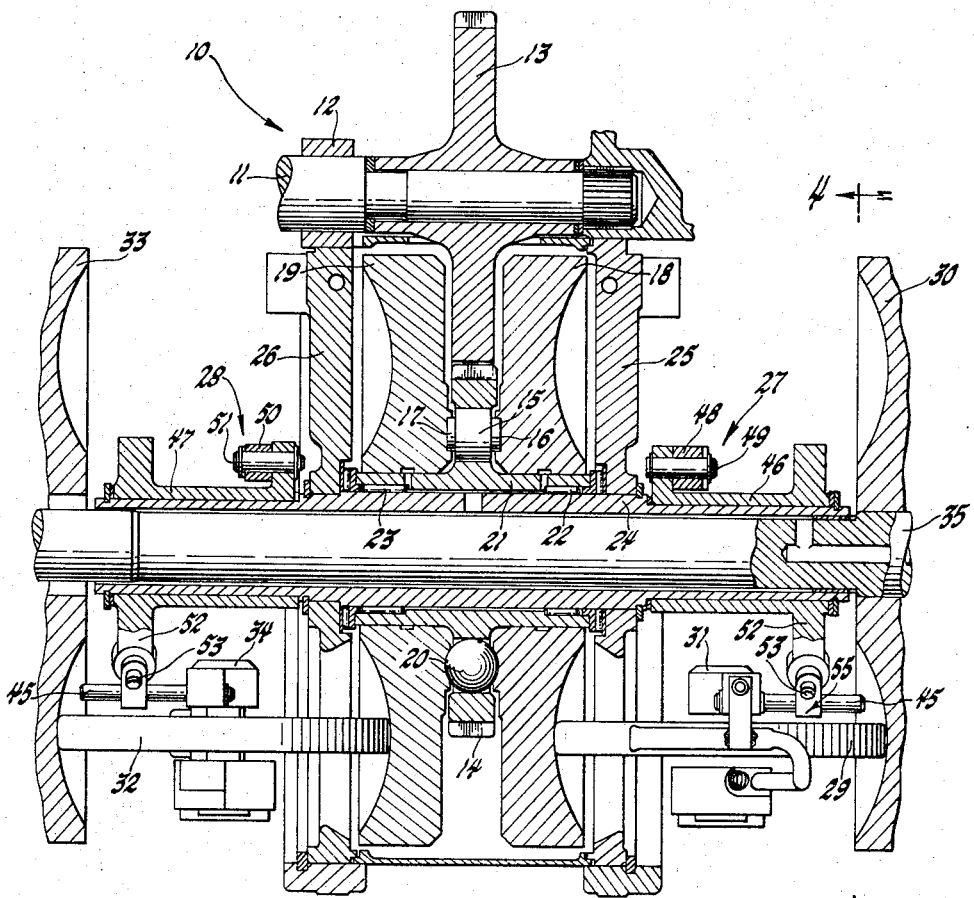
Figure 2:
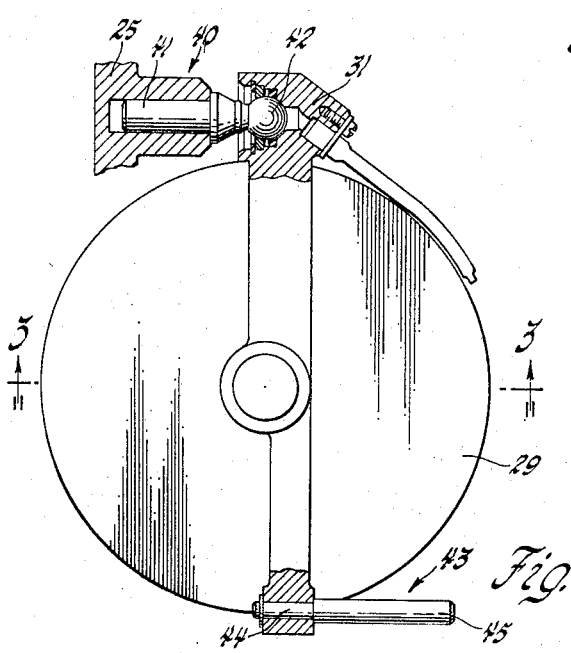
Figure 3:
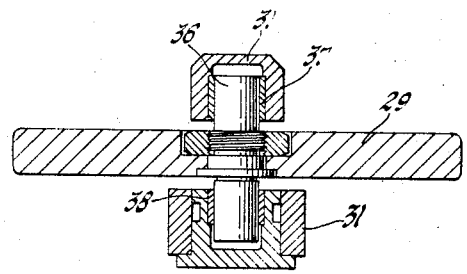

These and other features of the invention will be apparent from the following description and drawings in which:

FIGURE 1 is a longitudinal section of the transmission,
FIGURE 2 is a partially sectional view illustrating the swivel joint support for the roller carrier,
FIGURE 3 is a sectional view through the carrier taken along the line 3—3 of FIGURE 2,
FIGURE 4 is a view taken along the line 4—4 of FIGURE 1,
FIGURE 5 is an enlarged view of the clip connection between the control collar pin and carrier collar pin, and
FIGURE 6 is a partially sectional view of the phasing shaft for changing ratio in both friction units.

Referring to FIGURE 1 there is shown a friction transmission indicated generally at 10 having an engine driven power input shaft 11 rotatably supported in a transmission housing 12. Shaft 11 drives a power input gear 13 in mesh with a gear 14 disposed intermediate friction drive power input races 18 and 19. Gear 14 drives power input races 18 and 19 through a drive connection 15 having drive connections 16 and 17 extending axially into recesses in races 18 and 19. Gear 14 also carries a series of balls 20 for transmitting axial thrust loading forces between the races. Races 18 and 19 are supported for rotation upon a sleeve 21 which sleeve receives a support sleeve 24. Needle bearings 22 and 23 are disposed between sleeve 21 and sleeve 24 and the support sleeve 24 is fixed relative to the transmission housing 12 by means of a pair of spaced spiders 25 and 26 fixed to the housing.

First and second friction units 27 and 28 are used to transmit torque to a power delivery shaft 35. In FIGURE 1 drive is transmitted from race 18 to a power delivery race 30 by a disc roller 29 supported for rotation in a roller carrier 31. Friction unit 28 includes a roller 32 contacting race 19 and a driven race 33. Roller 32 is rotatably supported in a roller carrier 34. A power delivery shaft 35 is driven by races 30 and 33. Since the structure of the carriers and control system is the same for both roller units 27 and 28, the description will be limited to that shown for unit 27.

As best shown in FIGURES 2 and 3, roller 29 is rotatably supported in carrier 31 by means of a roller shaft 36 supported in bushings 37, 38. Carrier 31 is supported upon a mooring mast 40 having a base 41 supported in spider 25 and having a ball head 42 forming with carrier 31 a swivel joint permitting tilt of carrier 31 with respect to the mooring mast 40. A carrier control pin 43 has a base 44 supported in carrier 31 and an upstanding pin portion 45. The pin portion 45 extends outwardly from carrier 31 at 90 degrees to carrier 31 adjacent the end of the carrier opposite mooring mast 40 and upwardly from the carrier on the opposite side of the carrier from the swivel joint.

As best shown in FIGURE 1, ratio control collars 46 and 47 are rotatably supported upon support sleeve shaft 24. A control link 48 is connected to control collar 46 by a pin 49 and a control link 50 is connected to control collar 47 by a pin 51. As best shown in FIGURE 4, three rollers 29 are supported in individual carriers 31 all controlled by control collar 46. Collar 46 has three upstanding arms 52, each arm supporting a pin 53 having a base 54 supported in arm 52 and eccentric with respect to pin portion 53. Pins 53 may be rotated in arms 52 to provide initial adjustment. As best shown in FIGURE 5, pins 45 and 53 are operably connected to each other by a clip indicated generally at 55 and having a cylindrical bore 56 for receiving pin 45 and a cylindrical bore 57 provided with convex surfaces $57_a$ for receiving pin 53. The convex surface $57_a$ permits angular motion of pin 53 in clip 55 without binding. The axis of bores 56 and 57 in clip 55 are disposed at 90° to each other to lie in planes perpendicular to each other to receive pins 45, 53.

Referring to FIGURE 6, the control links 48 and 50 of the friction drive units 27 and 28 are simultaneously actuated in response to rotation of a phasing shaft 60. A pair of axially spaced support sleeves 63 and 64 are mounted in fixed supports 62 and 61, respectively, which may be grounded to the transmission case. A lever 65 disposed between sleeves 63, 64 may be rotated to rotate shaft 60. Lever 65 may be operatively connected to a piston rod 66 of a hydraulic servo 68 by means of a pin connection 67. An arm 69 splined to shaft 60 is connected to control link 48 by a pin connection 70. An arm 71 splined to shaft 60 is connected to control link 50 by a pin connection 72. It will be apparent that rotation of shaft 60 by movement of piston rod 66 will simultaneously cause movement of control links 48 and 50 of both friction drive units 27 and 28, and the ratio control collars of both units.

Considering the operation of the device to accomplish a change of drive ratio the pressure supplied to servo 68 may be varied by control valving, not shown. Piston rod 66 will move to a new position called for by the ratio pressure supplied to servo 68. Movement of piston rod 66 turns phasing shaft 60 and moves the drive links 48 and 50 in each toric section, thereby rotating the ratio control collars 46 and 47. Since all rollers act alike, explanation will be confined to one roller.

Rotation of ratio control collar 46 also moves collar pin 53 in an arc thereby causing carrier pin 45 to move. Since the roller is held by its friction contact with its drive and driven races and the carrier 31 by its swivel mount on its mooring mast 40, the initial motion of the carrier pin 45 can only cause the roller 29 to incline about its friction contacts with the races and the carrier 31 to incline about its mooring mast 40. This initial inclination of the roller 29 produces relatively large steering forces at the roller-race contacts. These steering forces exert a tilting couple which causes the carrier and roller to tilt about the mooring mast. As the roller and carrier tilt, carrier pin 45 is held in contact with the ratio collar pin 53. This forces the inclination angle and the steering force to decrease as the tilt of the roller approaches the tilt called for. Roller tilt will continue until the steering forces become zero, or until the roller has assumed the new position called for.

It can be seen from FIGURE 1 that for each position of collar 46 there is only one tilt position where a plane through the roller-race contacts intersects the mooring mast center. This is the equilibrium position. Any movement of the roller away from this equilibrium position will immediately produce a roller inclination in such a direction so as to drive the roller back to its first location. Also, the inclination angle (or steering force) is proportional to the difference between the desired and actual roller position. Thus the control system is a displacement feedback type of control.

To provide adjustments within a roller section due to manufacturing tolerance stack up or deviations, the collar pins 53 have an eccentric mount in the collar as heretofore explained, allowing pin movement with respect to the collar. This initial collar pin adjustment permits easy and simple adjustment of the rollers in a given section such that the rollers in the section may be placed at the same initial tilt angle irrespective of stack up of manufacturing tolerances. Once pins 53 and eccentric portion 54 are rotated to a desired position relative to collar arms 52, they are fixed in the desired position by nut 53a.

To correct rollers between sections, the drive links are connected to the crank arms 69, 71 by a pin with an eccentric section 70a, eccentric with respect to pin portion 70. The collar pin eccentric throw is of the order of .010 inch while the eccentric throw of the drive link pins is of the order of .02 inch. It will readily be understood that once the collar pin 53 is rotated to its desired position relative to arm 52 it will be held in such position by nut 53a and that once the pin 70 is rotated relative to control link 48 to its desired position it will be held in such position by nut 74. Likewise arm 71 is connected to link 50 by a pin 72 having a portion 72a eccentric with respect to pin 72. The eccentricity, once determined is retained by tightening nut 75.

It will be readily understood that rotation of control shaft 60 will actuate the linkage mechanism to simultaneously rotate both the front and rear unit control collars, to thereby change the drive ratio of both friction units. Pins 53 and 45 readily accommodate relative motion of the pins in their respective bores upon rotation of the control collars.

We claim:

1. In a toroidal transmission having spaced toroidal discs with a roller for transmitting torque between said discs, a roller carrier, means rotatably supporting said roller in said carrier, means adjacent one end of said carrier forming a swivel joint support for said carrier, a carrier pin extending outwardly from said carrier, a rotatable control collar, a control pin extending outwardly from said control collar, means connecting said control pin to said carrier pin, and means for rotating said control collar to change the transmission drive ratio.

2. A transmission as set forth in claim 1 wherein the means for connecting said control pin to said carrier pin comprises a clip having first and second bores disposed in different planes, said carrier pin extending through one of said bores and said control pin extending through the other of said bores.

3. A transmission according to claim 1 wherein at least one of said pins is rotatable relative to its support member for adjusting the eccentricity of said pin with respect to its support member.

4. A transmission according to claim 1 wherein said control pin is rotatable relative to said control collar to vary the eccentricity of said pin relative to said control collar.

5. A friction transmission of the type having first and second spaced torus discs, a plurality of rollers for transmitting torque between said discs, a carrier for rotatably supporting each of said discs, respectively, a mooring mast for each of said carriers, respectively, providing a swivel support for each of said carrier, respectively, a rotatable ratio control collar, an upstanding pin on each of said carriers extending outwardly from said carriers, respectively, a plurality of arms on said control collar, a control pin carried by each of said arms, respectively, each of said control pins, respectively, terminating adjacent one of said carrier pins, respectively, means connecting each of said control pins, respectively, to its adjacent carrier pin, respectively, each of said pins being movable relative to said connecting means upon rotation of said control collar, and means for rotating said control collar.

6. A transmission according to claim 5 wherein each of said control pins is provided with a hub portion eccentric with respect to the upstanding pin portion for permitting initial adjustment of the position of said pin relative to said control collar.

7. A transmission according to claim 5 wherein the means for connecting said control pin to said carrier pin comprises a clip having a first bore for receiving said carrier pin and a second bore extending in a direction perpendicular to the longitudinal axis of said first bore for receiving said control pin.

8. A friction drive transmission having axially spaced first and second friction units, each of said units including a drive torus and a driven torus, a roller in each unit for transmitting torque between the drive and driven torus of each unit, a support sleeve extending through and rotatably supporting the drive torus of each unit, drive means extending between the drive torus of each unit for driving drive torus of each unit, a power delivery shaft extending through said support sleeve and rotatably supported in said sleeve, said power delivery shaft providing a support for and being driven by the driven torus of each unit, a first unit control collar disposed intermediate the drive torus and driven torus of said first unit and supported for rotation on said support sleeve, a second unit control collar disposed between the drive torus and driven torus of said second unit and supported for rotation on said support sleeve, a carrier for supporting said first unit roller, a swivel joint support for said carrier, a carrier pin extending outwardly from said carrier, a collar pin extending outwardly from said control collar, a clip for operatively connecting said carrier pin to said collar pin, said clip having a first bore for receiving said carrier pin and a second bore extending perpendicular to the axis of said first bore for receiving said control collar pin, a second unit carrier for supporting said second unit roller, a swivel joint support for said second unit carrier, a carrier pin extending outwardly from said second unit carrier, a collar pin extending outwardly from said second unit control collar, a second clip for connecting said last-mentioned carrier pin to said last-mentioned control collar pin, said second clip having bores extending perpendicular to each other for receiving said pins, a rotatable control shaft, and linkage means for connecting said last-mentioned shaft to each of said control collars, respectively, for simultaneously rotating both of said control collars upon rotation of said last-mentioned shaft.

9. A transmission as set forth in claim 8 wherein said control collar pins are mounted in their control collars by a base portion eccentric with respect to said pins, said pins being rotatable in said collars for initially adjusting the position of the rollers in each unit, respectively.

References Cited

UNITED STATES PATENTS 2,971,390  2/1961  Rygelis et al. _____ 74—200
3,306,119  2/1967  De Brie Perry et al. ___ 74—200

FRED C. MATTERN, Jr., *Primary Examiner.*

C. J. HUSAR, *Assistant Examiner.*